US012273849B2

(12) United States Patent
Razavi et al.

(10) Patent No.: US 12,273,849 B2
(45) Date of Patent: Apr. 8, 2025

(54) NETWORK ASSISTANCE POSITIONING INTEGRITY REPORTING

(71) Applicant: TELEFONAKTIEBOLAGET LM ERICSSON (PUBL), Stockholm (SE)

(72) Inventors: Sara Modarres Razavi, Stockholm (SE); Fredrik Gunnarsson, Linköping (SE); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 377 days.

(21) Appl. No.: 17/916,269

(22) PCT Filed: Apr. 1, 2021

(86) PCT No.: PCT/IB2021/052752
§ 371 (c)(1),
(2) Date: Sep. 30, 2022

(87) PCT Pub. No.: WO2021/198983
PCT Pub. Date: Oct. 7, 2021

(65) Prior Publication Data
US 2023/0180171 A1 Jun. 8, 2023

Related U.S. Application Data

(60) Provisional application No. 63/005,068, filed on Apr. 3, 2020.

(51) Int. Cl.
*H04W 64/00* (2009.01)
*H04W 4/029* (2018.01)
*H04W 12/108* (2021.01)

(52) U.S. Cl.
CPC .......... *H04W 64/00* (2013.01); *H04W 4/029* (2018.02); *H04W 12/108* (2021.01)

(58) Field of Classification Search
CPC .... H04W 4/029; H04W 12/108; H04W 64/00
USPC ........................................................ 455/456
See application file for complete search history.

(56) References Cited

U.S. PATENT DOCUMENTS

2017/0272900 A1 9/2017 Do

FOREIGN PATENT DOCUMENTS

CN        101598779    *  7/2009
EP         4109958 A1     12/2022

OTHER PUBLICATIONS

English Translation of CN101598779 (Year: 2009).*
Qualcomm Incorporated, New SID on NR Positioning Enhancements, 3GPP TSG RAN Meeting #86, RP-193142, Sitges, Spain, Dec. 9-12, 2019.
R2-2010675 Interdigital "Summary of 8.11.3.3 Methodologies for network-assisted and UE-assisted integrity", 3GPP TSG-RAN WG2 #112-e, Electronic Meeting, Nov. 2-13, 2020.
(Continued)

*Primary Examiner* — Ted M Wang
(74) *Attorney, Agent, or Firm* — Ericsson Inc.

(57) ABSTRACT

Systems and methods for generating and configuring integrity parameters associated with positioning measurements and calculations are provided herein. Integrity KPIs can be defined by a network node for positioning assistance information and location information reporting, and can be provided to a wireless device to assist in assessing the integrity level associated with a positioning estimation.

30 Claims, 12 Drawing Sheets

(56) References Cited

OTHER PUBLICATIONS

Swift Navigation, Deutsche Telekom, Motivation, Rel-17 Positioning Integrity, 3GPP TSG RAN#86, RP-192750, Sitges, Spain, Dec. 9-12, 2019.
U-BLOX AG, Report of email discussion [99bis#57][LTE/Positioning] Future phase support of SSR, 3GPP TSG-RAN WG2 Meeting #101-Bis, R2-1804428, Sanya, China, Apr. 16-20, 2018.
ISR and Written Opinion dated Jun. 23, 2021 from corresponding application PCT/IB2021/052752.

* cited by examiner

Figure 2

NETWORK ASSISTANCE POSITIONING INTEGRITY REPORTING

CROSS REFERENCE TO RELATED APPLICATIONS

This application claims the benefit of U.S. Provisional Application No. 63/005,068 filed on Apr. 3, 2020, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), side-link device-to-device (D2D) and other use cases.

Positioning and location services have been topics in LTE standardization since 3GPP Release 9. An objective was to fulfill regulatory requirements for emergency call positioning. Positioning in NR is proposed to be supported by the example architecture shown in FIG. 1. LMF 130A represents the location management function entity in NR. There are also interactions between the LMF 130A and the gNodeB 120 via the NRPPa protocol. The interactions between the gNodeB 120 and the device (UE) 110 are supported via the Radio Resource Control (RRC) protocol. Other network nodes, such as Access and Mobility Management Function (AMF) 130B and evolved Serving Mobile Location Center (e-SMLC) 130C, may be involved in positioning support.

Note 1: The gNB 120B and ng-eNB 120A may not always both be present.

Note 2: When both the gNB 120B and ng-eNB 120A are present, the NG-C interface is only present for one of them.

In the legacy LTE standards, the following techniques are supported:

Enhanced Cell ID. Essentially cell ID information to associate the device to the serving area of a serving cell, and then additional information to determine a finer granularity position.

Assisted GNSS. GNSS information retrieved by the device, supported by assistance information provided to the device from E-SMLC OTDOA (Observed Time Difference of Arrival). The device estimates the time difference of reference signals from different base stations and sends to the E-SMLC for multilateration.

U-TDOA (Uplink TDOA). The device is requested to transmit a specific waveform that is detected by multiple location measurement units (e.g. an eNB) at known positions. These measurements are forwarded to E-SMLC for multilateration.

DL-TDOA (Downlink TDOA). The device estimates its position based the time difference of DL reference signals from different base stations and their positions. Sensor methods such as biometric pressure sensor which provides vertical position of the device and Inertial Motion Unit (IMU) which provides displacement.

The NR positioning for Release 16, based on the 3GPP NR radio-technology, is positioned to provide added value in terms of enhanced location capabilities. The operation in low and high frequency bands (i.e. below and above 6 GHz) and utilization of massive antenna arrays provide additional degrees of freedom to substantially improve the positioning accuracy. The possibility to use wide signal bandwidth in low and especially in high bands brings new performance bounds for user location for well-known positioning techniques based on OTDOA, U-TDOA, DL-TDOA, Cell-ID or E-Cell-ID etc., utilizing timing measurements to locate a UE.

Until now, accuracy has been the primary positioning performance metric which has been discussed and supported in 3GPP. Emerging applications relying on high-precision positioning technology in autonomous applications (e.g. automotive) have brought with them the need for higher integrity and reliability in addition to high accuracy. The 5G service requirements specified in 3GPP TS 22.261 include the need to determine the reliability, and the uncertainty or confidence level, of the position-related data.

In RP-193237, a SI on "New SID on NR Positioning Enhancements" has been discussed in which one of the objectives is to:

Study solutions necessary to support integrity and reliability of assistance data and position information: [RAN2]

Identify positioning integrity KPIs and relevant use cases.

Identify the error sources, threat models, occurrence rates and failure modes requiring positioning integrity validation and reporting.

Study methodologies for network-assisted and UE-assisted integrity.

Integrity is referred to as the measure of trust that can be placed in the correctness of information supplied by a navigation system. Integrity includes the ability of a system to provide timely warnings to user receivers in case of failure. Any use case related to positioning in Ultra Reliable Low Latency Communication (URLLC) typically requires high integrity performance. Example use cases include V2X, autonomous driving, UAV (drones), eHealth, rail and maritime, emergency and mission critical. In use cases in which large errors can lead to serious consequences such as wrong legal decisions or wrong charge computation, etc., the integrity reporting may become crucial.

Figure 2:
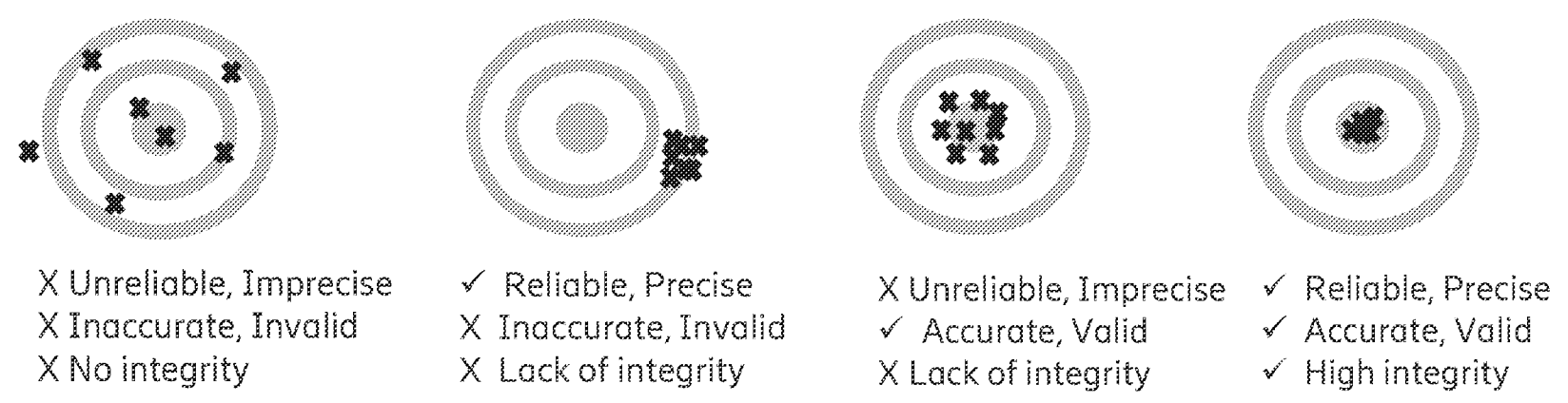

FIG. 2 illustrates an example definition of accuracy, precision, validity, reliability and integrity. It can be assumed that "accuracy" is the same term as "validity" in positioning. Also, terms such as reliability, precision, certainty and confidence level can be used interchangeably. However, integrity requires the evaluation of both accuracy and reliability.

There are several example Integrity KPIs defined below that can help identify different integrity events:

Alert Limit (AL): is the largest error allowable for safe operation.

Time to Alert (TTA): is the maximum allowable elapsed time from the onset of a positioning failure until the equipment announces the alert.

Integrity Risk (IR): is the maximum probability of providing a signal that is out of tolerance without warning the user in a given period of time.

Protection Level (PL): is the statistical error bound computed to guarantee that the probability of the absolute position error exceeding the said number is smaller than or equal to the target integrity risk.

FIG. 3 illustrates an example Stanford plot in which the possible integrity operations and events can be explained in its different regions.

Nominal Operation is when the Position Error (PE) is less than the Protection Level (PL) which is less than the Alert Limit (AL) (e.g. PE<PL<AL).

System unavailable is when AL<PL.

Misleading Operation is when PL<PE.

Hazardous Operation is when PL<AL<PE.

Integrity Failure is an integrity event that lasts for longer than the TTA and with no alarm raised within the TTA.

Misleading Information (MI) is an integrity event occurring when, the system being declared available, the position error exceeds the protection level but not the alert limit.

Hazardously Misleading Information (HMI) is an integrity event occurring when, the system being declared available, the position error exceeds the alert limit.

SUMMARY

It is an object of the present disclosure to obviate or mitigate at least one disadvantage of the prior art.

There are provided systems and methods for generating, configuring and using integrity parameters associated with positioning measurements and calculations.

In a first aspect, there is provided a method performed by a network node. The network node can comprise a radio interface and processing circuitry and be configured to determine an integrity risk (IR) parameter associated with a wireless device. The IR parameter can indicate a maximum probability of providing a positioning service that is out of a tolerance range. The network node transmits, to the wireless device, positioning assistance information and the IR parameter. The network node receives, from the wireless device, an estimated position and a protection level (PL) parameter. The PL parameter can indicate a statistical error bound computed to guarantee that probability of a position error exceeding the PL is less than or equal to the IR.

In some embodiments, the network node determines an integrity of the positioning estimation in accordance with the received PL parameter.

In some embodiments, the IR parameter can be associated with one or more positioning reference signal (PRS).

In some embodiments, the positioning assistance information is one of Observed Time Difference of Arrival (OTDOA) information or Downlink Time Difference of Arrival (DL-TDOA) information. The IR parameter can be associated with a complete set of OTDOA or DL-TDOA information.

In some embodiments, the IR parameter can be determined in accordance with at least one of: a clock drift of the network node; a synchronization error of the network node; a wireless device type; a bandwidth and carrier frequency; an indoor or outdoor classification of the wireless device; a serving cell or serving beam; a speed, acceleration, or sensor information from the wireless device; a previous wireless device experience in a similar condition; an expected Reference Signal Time Difference (RSTD) or RSTD search window; and a co-ordinate of a cell boundary or center.

In some embodiments, the network node can further determine an alert limit (AL) parameter associated with the wireless device, the AL parameter indicating a largest error allowable for safe operation. The network node can transmit the AL parameter to the wireless device.

In some embodiments, the AL parameter can be determined in accordance with at least one of: a wireless device type; a bandwidth and carrier frequency; an indoor or outdoor classification of the wireless device; map information; and speed, acceleration, or sensor information from the wireless device.

In another aspect, there is provide a method performed by a wireless device. The wireless device can comprise a radio interface and processing circuitry and be configured to receive, from a network node, positioning assistance information and an integrity risk (IR) parameter. The IR parameter can indicate a maximum probability of providing a positioning service that is out of a tolerance range. The wireless device performs positioning measurements to determine an estimated position of the wireless device. The wireless device determines a Protection Level (PL) parameter based at least in part on the IR parameter. The PL parameter can indicate a statistical error bound computed to guarantee that probability of a position error exceeding the PL is less than or equal to the IR. The wireless device transmits, to the network node, the estimated position and the PL parameter.

In some embodiments, the wireless device monitors the IR parameter while performing the positioning measurements.

In some embodiments, the IR parameter can be associated with one or more positioning reference signal (PRS).

In some embodiments, the positioning assistance information is one of Observed Time Difference of Arrival (OTDOA) information or Downlink Time Difference of Arrival (DL-TDOA) information. The IR parameter can be associated with a complete set of OTDOA or DL-TDOA information.

In some embodiments, the wireless device monitors the IR parameter associated with each PRS to determine which PRS to include in positioning measurements.

In some embodiments, the wireless device can further receive an alert limit (AL) parameter, the AL parameter indicating a largest error allowable for safe operation. The wireless device can monitor the AL parameter while performing the positioning measurements.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 2 illustrates an example definition of reliability, accuracy and integrity metrics;

DETAILED DESCRIPTION

Figure 1:
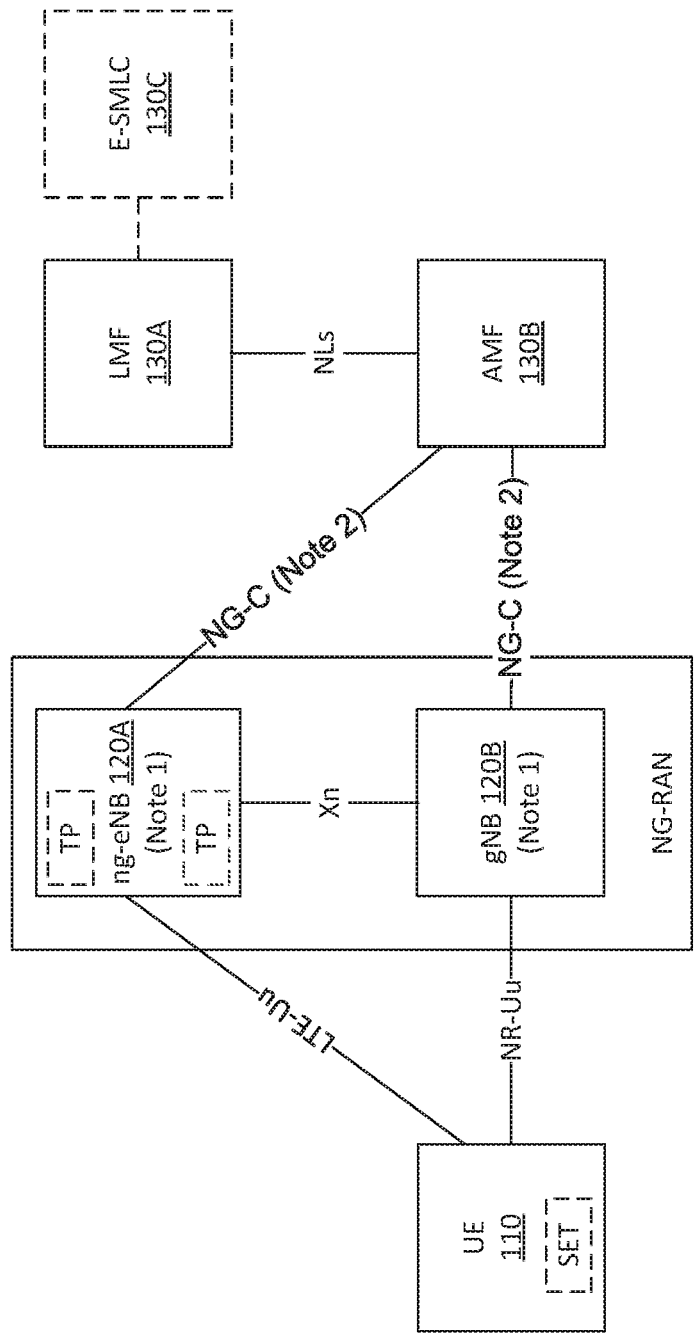
FIG. 1 illustrates an example of NR positioning architecture.
Figure 3:
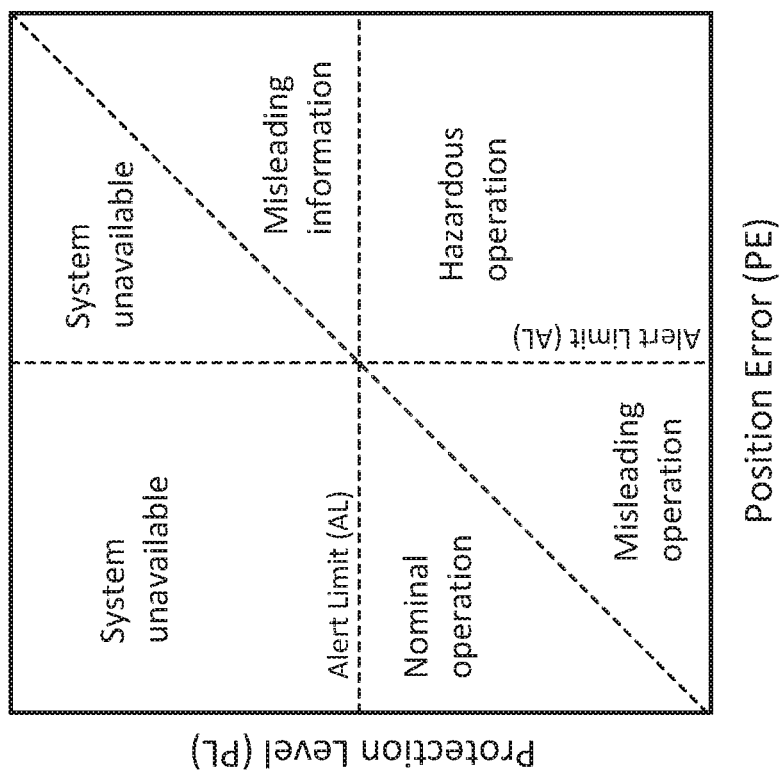
FIG. 3 is an example Stanford plot.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 9.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 11.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re)selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G/NR concepts, beams may be used instead of cells and, as such, it is important to note that the concepts described herein are equally applicable to both cells and beams.

Figure 4A:
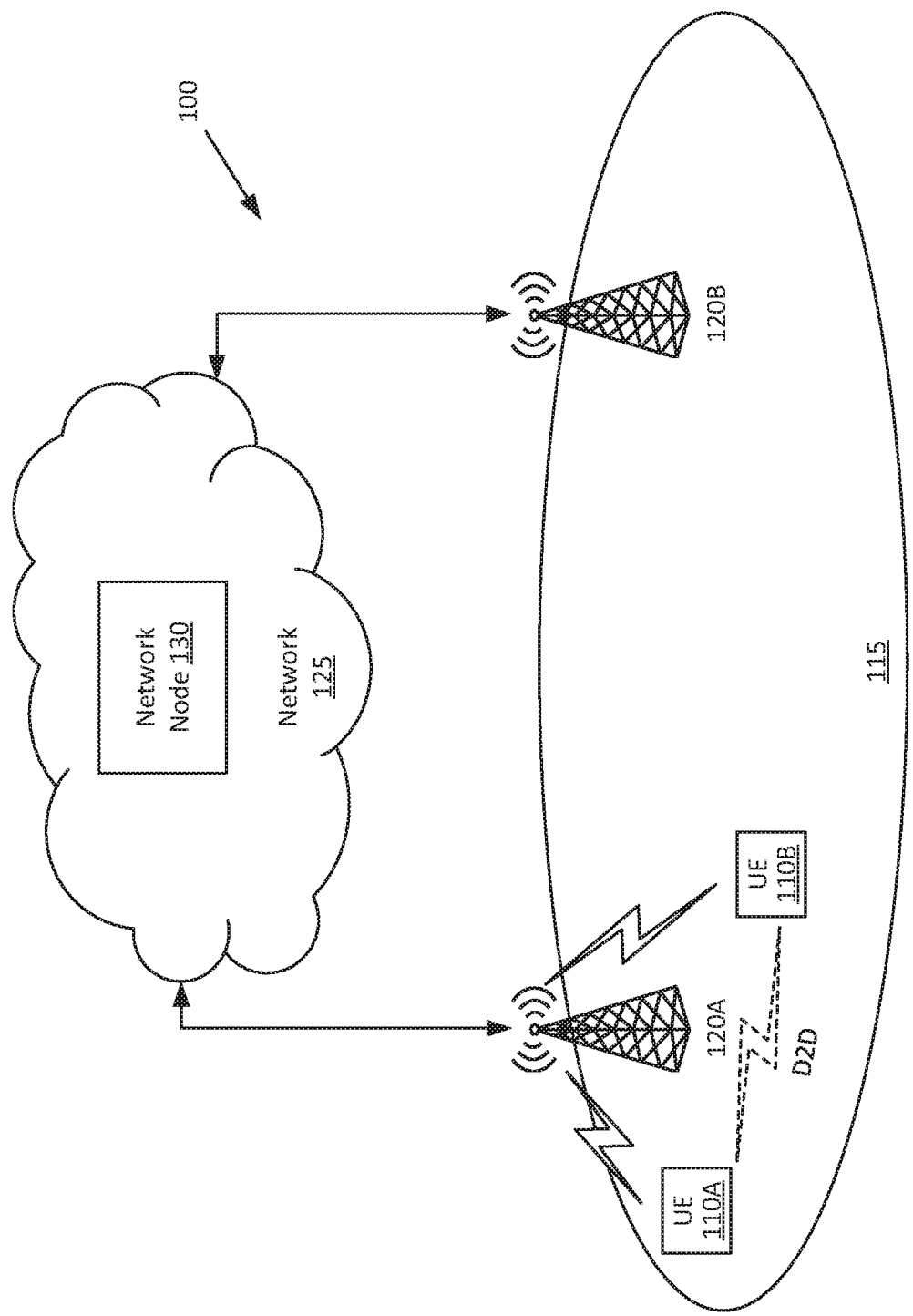
FIG. 4a illustrates an example wireless network.

FIG. 4a illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), location server node, MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 4B:
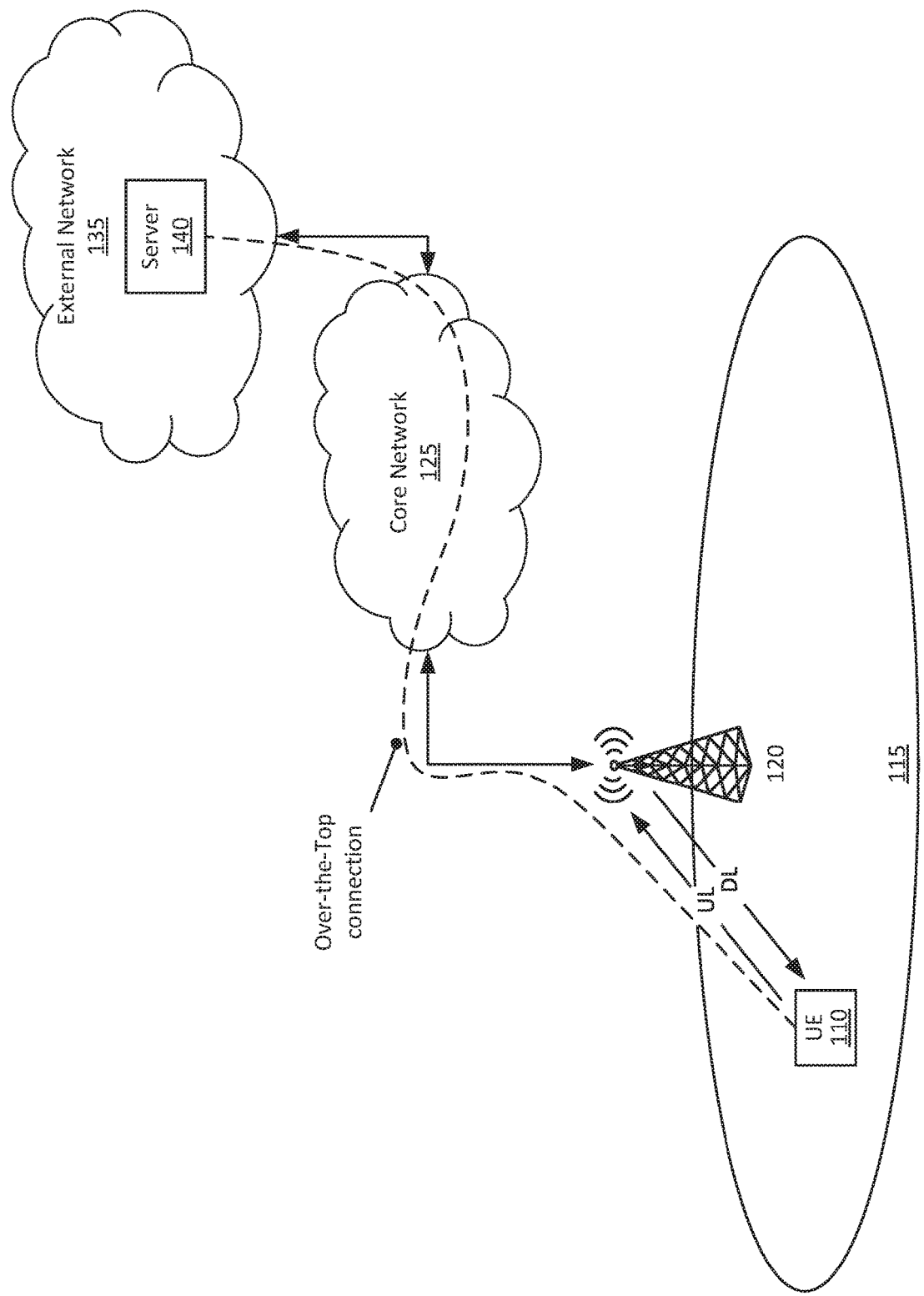
FIG. 4b illustrates an example of signaling in a wireless network.

FIG. 4b illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

Returning to positioning performance metrics, in the conventional positioning support of LTE and NR networks, there is no network assistance in terms of integrity reporting.

Therefore, a UE is not capable of assessing its positioning estimation integrity. This can be considered an important parameter when dealing with use cases requiring high reliability of the positioning accuracy.

In some embodiments described herein, the network, based on target device type, capabilities, use case and/or other potential factors can assist a target device in terms of Alert Limit and the Integrity Risk of the positioning reference signals (PRS). Accordingly, the device may compute its Protection Level and estimate its position, and therefore can assess if its position estimation is in nominal operation or not.

Some embodiments herein are described with respect to PRS-based positioning methods, such as OTDOA, for exemplary purposes. However, it will be appreciated that they are also applicable for other RAT-dependent or hybrid positioning methods using reference signals.

Figure 5:
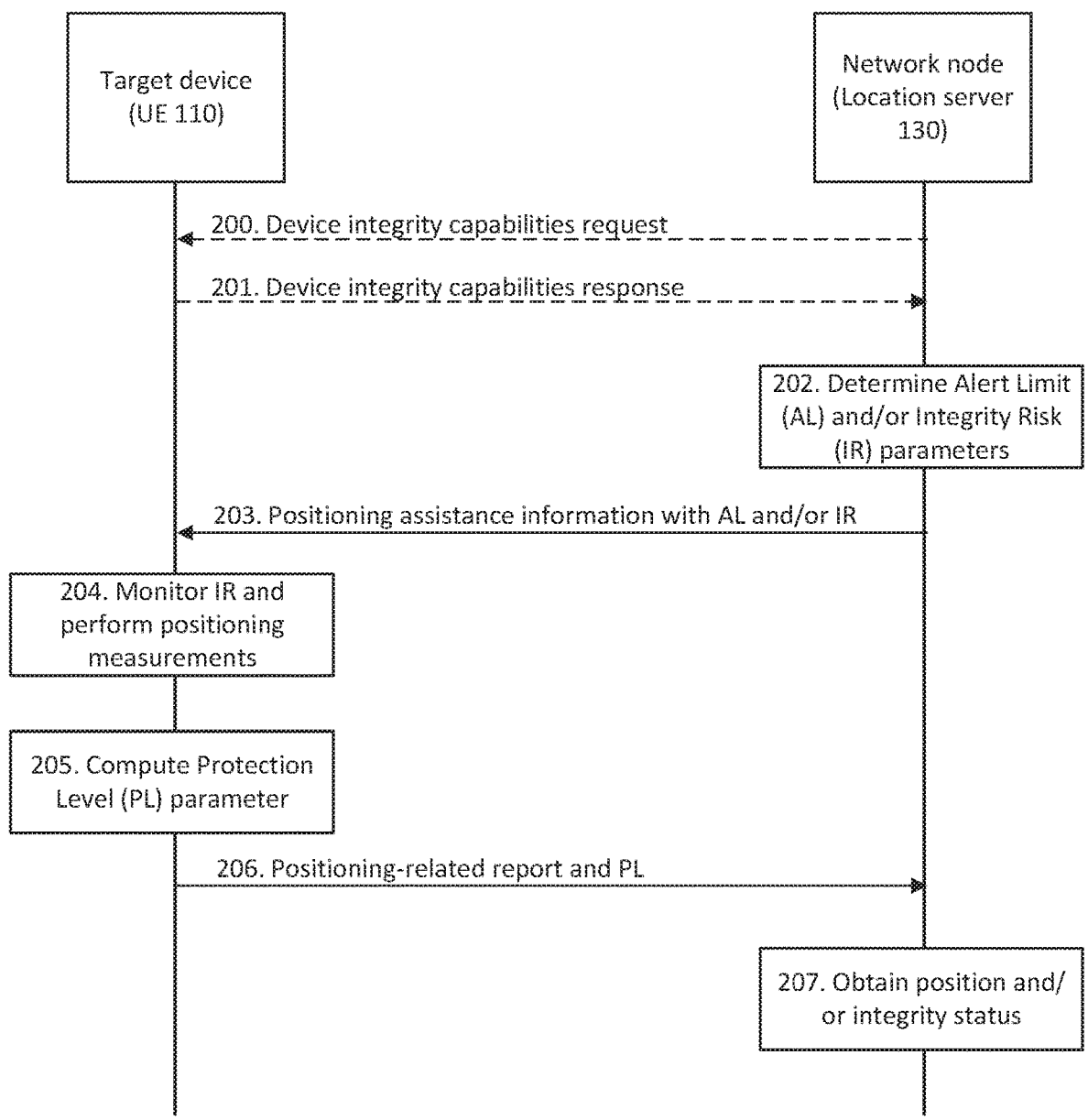
FIG. 5 is a signaling diagram illustrating.

FIG. 5 is an example signaling diagram illustrating the basic signaling steps from the perspective of the network node (e.g. location server 130) and the target device (e.g. UE 100) according to certain embodiments. Network node 130 and UE 110 can exchange capabilities information related to device integrity (steps 200, 201). The network node 130 can select an Alert Limit and/or Integrity Risk for the UE 100 (step 202). The Alert Limit and/or Integrity Risk can be associated with one or more PRS(s). The network node 130 can then provide the Alert Limit and/or Integrity Risk parameters with OTDOA assistance information to UE 110 (step 203). UE 110 monitors the Integrity Risk for its PRS(s) and obtains positioning measurements (step 204). The Protection Level can be computed in accordance with the received Integrity Risk parameter (step 205). UE 110 can then report the positioning measurements and the computed Protection Level (step 206). Accordingly, the network node 130 obtains positioning and/or integrity status (step 207).

In some embodiments, step 206 can involve UE 110 providing OTDOA results along with uncertainty and quality of measurements. This can be further considered by the network node 130 to identify/determine the integrity of the estimated calculated positioning co-ordinates. In some embodiments, UE 110 may include additional reports from, for example, a motion-sensor, barometric pressure sensor, etc., which can be further used by the network node 130 to determine the integrity of the estimation. If the UE 110 has been moving a lot during the measurement(s), it may lead to an unreliable reading.

It will be appreciated that some of the positioning-related messages described herein (e.g. request, response, report, acknowledgement, etc.) could be mandated as part of the procedure in some implementations (i.e. not configurable), while in other implementations they can be configurable through signaling.

Some embodiments provide solutions for integrating and evaluating the integrity level of the positioning estimation. Accordingly, the network can assist a device in terms of alert limit and integrity risk for a PRS. The device can assess its positioning estimation and associated integrity level. The device can monitor the integrity risk of each PRS and determine which to select or avoid for obtaining positioning measurement(s). The network can receive the computed PL from the device(s) for future integrity risk estimations.

As discussed, in some embodiments there are three potential integrity parameters which can be set either by the network node or the target device: Alert Limit, Integrity Risk, Protection Level.

The Alert Limit (AL) can be set for each application or use case. Therefore, it can be known by either the location server or the UE or by both, and it can be also shared from one to another by request. The network node can request for device integrity capabilities to understand whether the device is capable of processing the assistance information in this respect. Moreover, the type of UE can help the network to assess the AL for that particular device.

AL is the largest error allowable for safe operation. The AL can be configured in accordance with one or more of the following items:
- Type of the device, and potentially known use-case
- Bandwidth and carrier frequency
- Indoor or outdoor classification of the device
- 3D map information
- Speed, acceleration, or other sensor information from the device
- Etc.

The AL can be reported to the device as an assistance data either automatically, when the device responds that it has integrity capability, or by a direct request from the device. A device may have the capability to set the AL by itself as well. In this case the device can report to the network on what AL it has assumed.

Figure 6:
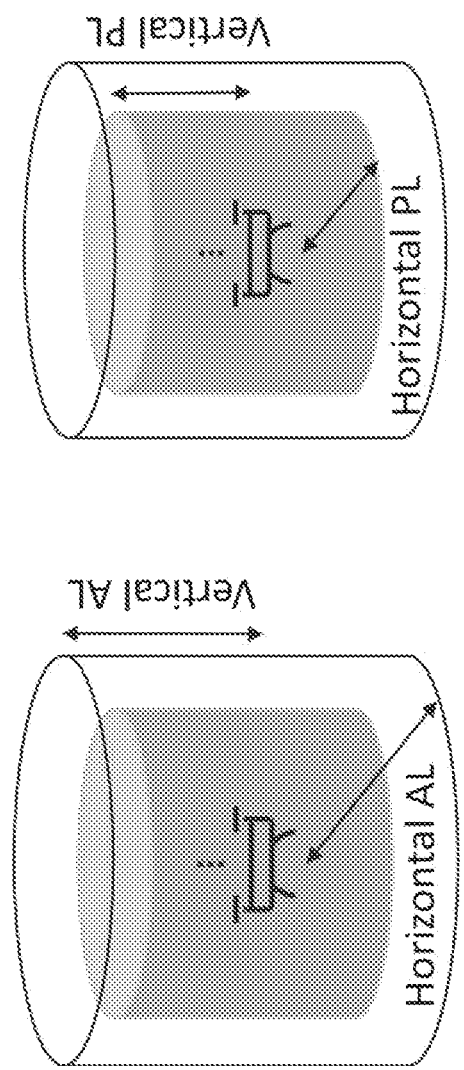
FIG. 6 illustrates an example of horizontal and vertical AL and PL.

The AL reporting can include the following example formats:
- The margin between two or three positioning information in two or three dimensions such as longitude, latitude and height (also referred to as coordinates) with respect to a geodetic datum (also referred to as a coordinate system), where the latter is either included in the location information or pre-configured.
- A reference center and a radius which defines the allowable error from the reference center, and a z-level that compares the allowable height in comparison to the ground level. This can be reported as horizontal and vertical AL separately. FIG. 6 illustrates an example definition of horizontal and vertical AL.

The positioning Integrity Risk (IR) parameter is set by the location server and can be provided to the UE as an assistance information. The IR is the maximum probability of providing a positioning service (e.g. signal, measurement, etc.) that is out of tolerance without warning the user in a given period of time. The network node can set this parameter either for the complete set of assistance data or for each positioning reference signal (PRS) of the suggested reference and neighbor cells separately.

The network node can configure the IR in accordance with one or more of the following parameters:
- Clock drift of each network node
- Synchronization error of each network node
- Device type
- Bandwidth and carrier frequency
- Indoor or outdoor classification of the device
- Serving cell or serving beam
- 3D map information
- Speed, acceleration, or other sensor information from the device
- Previous UE experiences on the IR with the similar condition
- Expected Reference Signal Time Difference (RSTD), RSTD search window
- Co-ordinate of cell boundary or center co-ordinate of cell and radius of the cell (the cell can be serving and/or neighbor reference cell)
- Etc.

The IR can be given either as an overall percentage value or a percentage value for each separate PRS of cells/beams as the OTDOA assistance information.

In some embodiments, the network node can send the AL and IR in one signal. In other embodiments, the network node can only send the IR to the device considering that the AL is assumed by the device.

The device with the OTDOA assistance information starts performing measurements and it can be so that the selection of the cells for OTDOA measurement would be identified based on monitoring the IRs. Further, the Protection Level (PL) can be computed at the device based on the IR received from the network node. PL is the statistical error bound computed to guarantee that the probability of the absolute position error exceeding the PL number is smaller than or equal to the target integrity risk. The device reports this to the network node in the location information reporting together with the computed position estimation or the RSTD measurements in the case of UE-assisted OTDOA positioning.

The PL reporting can include the following example formats:
  The margin between two or more positioning information in two or three dimensions such as longitude, latitude and height (also referred to as coordinates) with respect to a geodetic datum (also referred to as a coordinate system), where the latter is either included in the location information or pre-configured.
  A reference center and a radius which defines the allowable error from the reference center, and also a z-level that compares the allowable height in comparison to the ground level. This can be reported as horizontal and vertical PL separately. FIG. 6 illustrates an example definition of horizontal and vertical PL.

Figure 7:
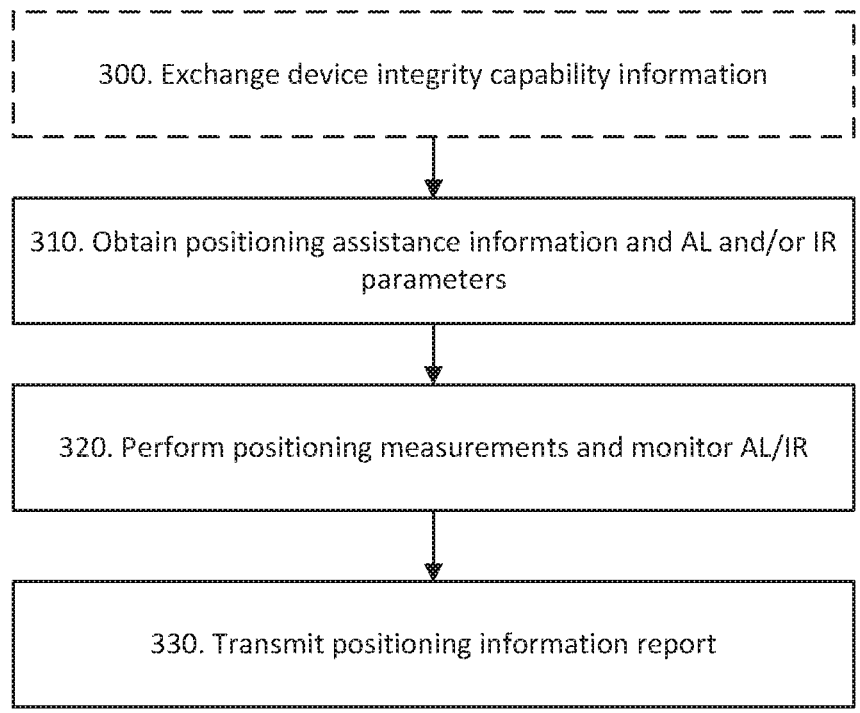
FIG. 7 is a flow chart illustrating a method which can be performed in a wireless device.

FIG. 7 is a flow chart illustrating a method which can be performed in a wireless device 110, such as a UE as described herein. The method can include:
  Step 300: Optionally, the wireless device can exchange device integrity capability information with the network. This can include receiving a device integrity capability request message from a network node and transmitting a device integrity capability response message to the network node.
  Step 310: The wireless device obtains positioning assistance information and at least one of Alert Limit (AL) and/or Integrity Risk (IR) parameters from the network. The AL parameter can indicate a largest error allowable for safe operation. The AL parameter can be associated with an application and/or a device (e.g. the particular wireless device 110). The IR parameter can indicate a maximum probability of providing a signal that is out of a tolerance range/limit. The IR parameter can be associated with the entire set of positioning assistance data or, alternatively, can be associated with one or more individual PRS(s). In some embodiments, the wireless device can receive the AL and/or IR parameters in the same signaling as the positioning assistance data. In other embodiments, the AL and/or IR parameters can be received in separate signaling.
  Step 320: The wireless device performs positioning measurements to determine its estimated position. The wireless device can monitor the AL and/or IR parameters while obtaining the positioning measurements. In some embodiments, the wireless device can monitor the IR associated with each PRS and determine which of the PRSs to include or avoid in obtaining measurements and calculations.

In some embodiments the wireless device can compute a Protection Level (PL) parameter based at least in part on the IR parameter received from the network. The PL parameter can indicate a statistical error bound computed to guarantee that the probability of the absolute position error exceeding said PL number is less than or equal to the IR.
  Step 330: The wireless device transmits a positioning information report to the network node. The positioning information can include its estimated position (e.g. the OTDOA results) and integrity-related information such as the computed PL parameter.

It will be appreciated that in some embodiments, the wireless device can communicate (e.g. transmit/receive messages) directly with a network node such as location server 130. In other embodiments, messages and signals between the entities may be communicated via other nodes, such as radio access node (e.g. gNB, eNB) 120.

It will be appreciated that one or more of the above steps can be performed simultaneously and/or in a different order. Also, steps illustrated in dashed lines are optional and can be omitted in some embodiments.

Figure 8:
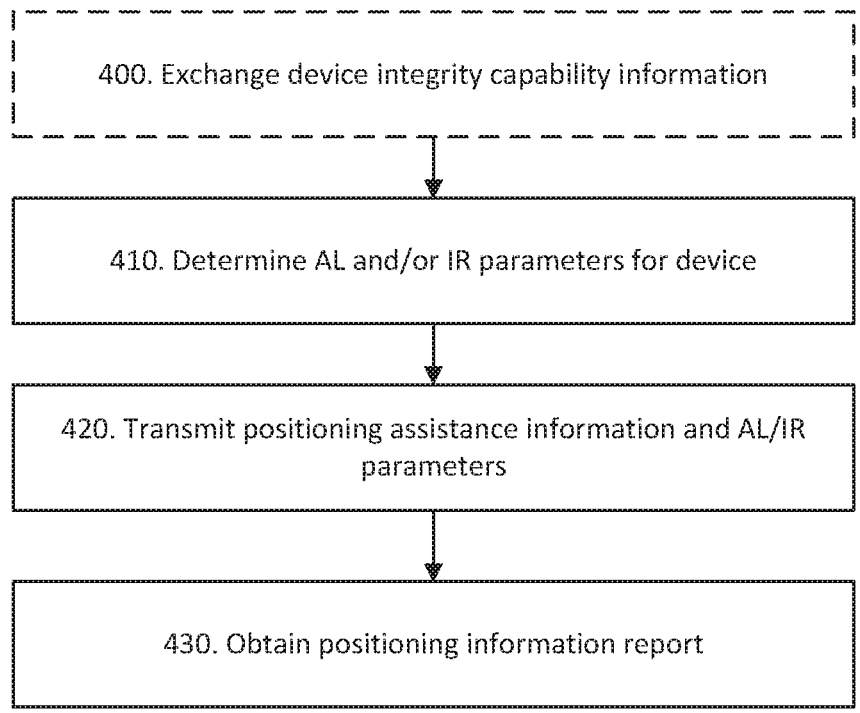
FIG. 8 is a flow chart illustrating a method which can be performed in a network node.

FIG. 8 is a flow chart illustrating a method which can be performed in a network node 130, such as a location server as described herein. The method can include:
  Step 400: Optionally, the network node can exchange device integrity capability information with a wireless device (e.g. UE 110). This can include transmitting a device integrity capability request message to one or more target devices and receiving at least one device integrity capability response message.
  Step 410: The network node can determine/select/identify at least one of Alert Limit (AL) and/or Integrity Risk (IR) parameters for the wireless device. The configuration of these parameters can be based on the device capability information as well as any number of additional factors as have been described herein. The AL and/or IR parameters can be associated with a particular application and/or device, particular assistance data and/or reference signals.
  Step 420: The network node transmits positioning assistance information (e.g. OTDOA, DL-TDOA) and at least one of the Alert Limit (AL) and/or Integrity Risk (IR) parameters to the wireless device. In some embodiments, the network node can transmit the AL and/or IR parameters in the same signaling as the positioning assistance data. In other embodiments, the AL and/or IR parameters can be transmitted in separate signaling. In some embodiments, the IR parameter can be associated with one or more PRS(s) in the positioning assistance information. In some embodiments, the IR parameter can be associated with all PRS(s) (e.g. the complete set) of the positioning assistance information.
  Step 430: The network node receives a positioning information report from the wireless device. The positioning information can include the estimated position (e.g. the OTDOA results) of the wireless device. The positioning information can further include information related to integrity, uncertainty and/or quality of the measurements. In some embodiments, this can include the computed PL parameter.

In some embodiments, the network node can determine the integrity (e.g. an "integrity status") of the estimated positioning co-ordinates in accordance with the received positioning information (e.g. the PL parameter).

It will be appreciated that in some embodiments, the network node 130 can communicate (e.g. transmit/receive messages) directly with a target wireless device 110. In other embodiments, messages and signals between the entities may be communicated via other nodes, such as radio access node (e.g. gNB, eNB) 120.

It will be appreciated that one or more of the above steps can be performed simultaneously and/or in a different order. Also, steps illustrated in dashed lines are optional and can be omitted in some embodiments.

Figure 9:
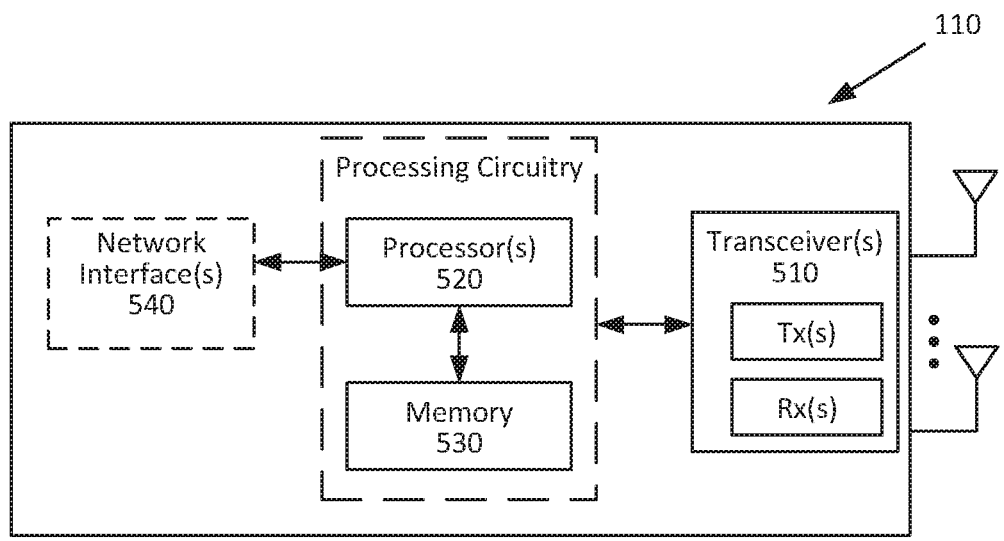
FIG. 9 is a block diagram of an example wireless device.

FIG. 9 is a block diagram of an example wireless device, UE 110, in accordance with certain embodiments. UE 110 includes a transceiver 510, processor 520, and memory 530. In some embodiments, the transceiver 510 facilitates transmitting wireless signals to and receiving wireless signals from radio access node 120 (e.g., via transmitter(s) (Tx), receiver(s) (Rx) and antenna(s)). The processor 520 executes instructions to provide some or all of the functionalities described above as being provided by UE, and the memory 530 stores the instructions executed by the processor 520. In some embodiments, the processor 520 and the memory 530 form processing circuitry.

The processor 520 can include any suitable combination of hardware to execute instructions and manipulate data to perform some or all of the described functions of a wireless device, such as the functions of UE 110 described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor 520. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 520 of UE 110.

Other embodiments of UE 110 may include additional components beyond those shown in FIG. 9 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 520. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 10:
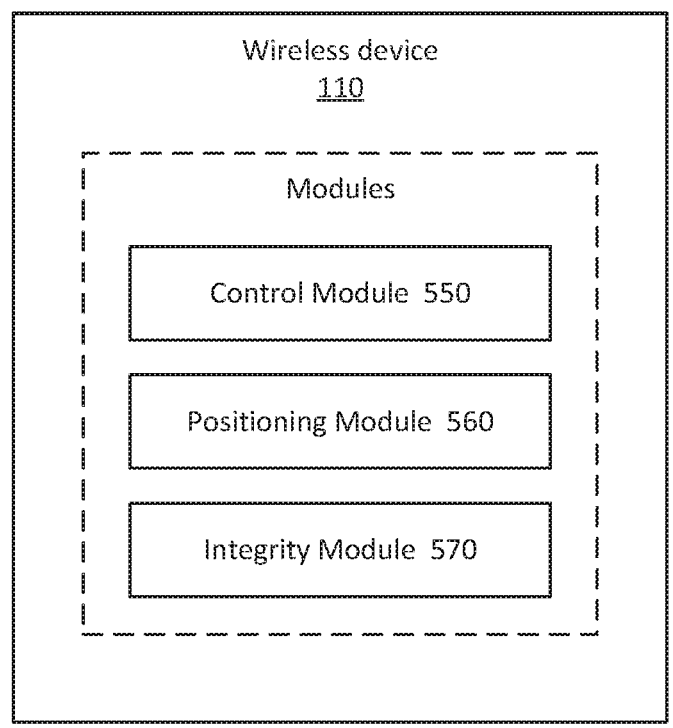
FIG. 10 is a block diagram of an example wireless device with modules

In some embodiments, the wireless device UE 110 may comprise a series of modules configured to implement the functionalities of the wireless device described above. Referring to FIG. 10, in some embodiments, the wireless device 110 may comprise a control module 550 for receiving and interpreting control/configuration/capability information, a positioning module 560 for performing positioning measurements and calculating an estimated position, and an integrity module 570 for monitoring and determining the integrity associated with the positioning measurements.

It will be appreciated that the various modules may be implemented as combination of hardware and software, for instance, the processor, memory and transceiver(s) of UE 110 shown in FIG. 9. Some embodiments may also include additional modules to support additional and/or optional functionalities.

Figure 11:
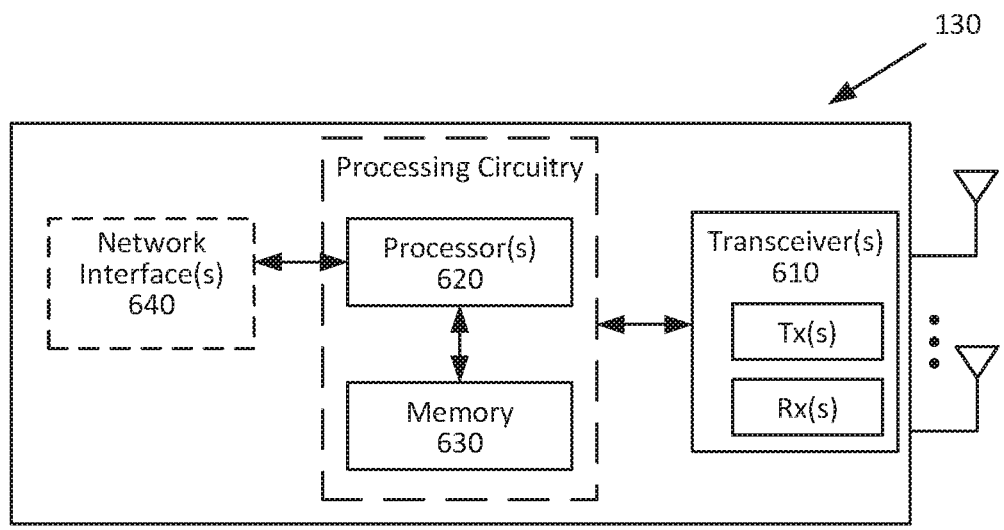
FIG. 11 is a block diagram of an example network node.

FIG. 11 is a block diagram of an exemplary network node 130. The exemplary node can be a location server or an access node, in accordance with certain embodiments. Network node 130 may include one or more of a transceiver 610, processor 620, memory 630, and network interface 640. In some embodiments, the transceiver 610 facilitates transmitting wireless signals to and receiving wireless signals from wireless devices, such as UE 110 (e.g., via transmitter(s) (Tx), receiver(s) (Rx), and antenna(s)). The processor 620 executes instructions to provide some or all of the functionalities described above as being provided by network node 130, the memory 630 stores the instructions executed by the processor 620. In some embodiments, the processor 620 and the memory 630 form processing circuitry. The network interface 640 can communicate signals to backend network components, such as a gateway, switch, router, Internet, Public Switched Telephone Network (PSTN), core network nodes or radio network controllers, etc.

The processor 620 can include any suitable combination of hardware to execute instructions and manipulate data to perform some or all of the described functions of network node 130, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for node 130, send output from node 130, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 130 can include additional components beyond those shown in FIG. 11 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 11 may be included in other network nodes (such as UE 110, radio access node 120, etc.). Other network nodes may optionally include or not include a wireless interface (such as the transceiver described in FIG. 11).

Figure 12:
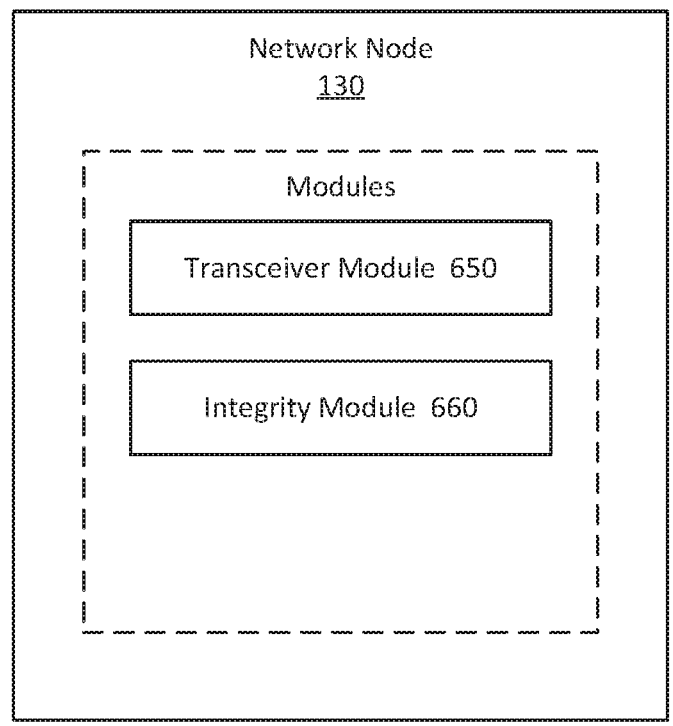
FIG. 12 is a block diagram of an example network node with modules.

In some embodiments, the network node 130, may comprise a series of modules configured to implement the functionalities of the network node described above. Referring to FIG. 12, in some embodiments, the network node 130 can comprise a transceiver module 650 for transmitting and receiving positioning-related messages, such as capability requests/responses, positioning information and reports, and an integrity module 660 for determining integrity-related parameter(s) associated with a device and for determining the integrity associated with an estimated position of the device.

It will be appreciated that the various modules may be implemented as combination of hardware and software, for instance, the processor, memory and transceiver(s) of network node 130 shown in FIG. 11. Some embodiments may also include additional modules to support additional and/or optional functionalities.

Figure 13:
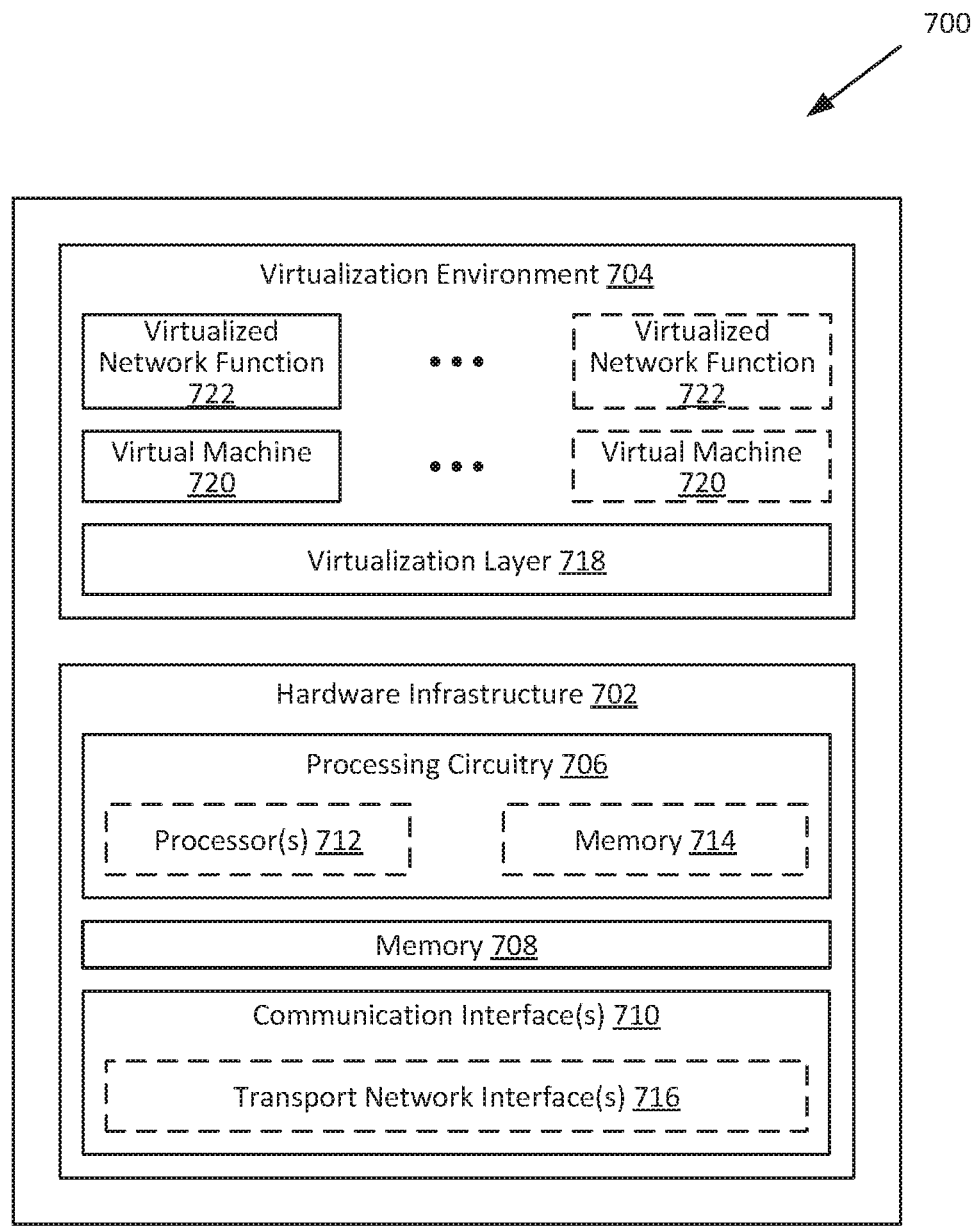
FIG. 13 is a block diagram of an example virtualized processing node.

Turning now to FIG. 13, some network nodes (e.g. UEs 110, radio access nodes 120, core network nodes 130, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 700 (or server).

Processing node 700 generally comprises a hardware infrastructure 702 supporting a virtualization environment 704.

The hardware infrastructure 702 generally comprises processing circuitry 706, a memory 708, and communication interface(s) 710.

Processing circuitry 706 typically provides overall control of the hardware infrastructure 702 of the virtualized processing node 700. Hence, processing circuitry 706 is generally responsible for the various functions of the hardware infrastructure 702 either directly or indirectly via one or more other components of the processing node 700 (e.g. sending or receiving messages via the communication interface 710). The processing circuitry 706 is also responsible for enabling, supporting and managing the virtualization environment 704 in which the various VNFs are run. The processing circuitry 706 may include any suitable combination of hardware to enable the hardware infrastructure 702 of the virtualized processing node 700 to perform its functions.

In some embodiments, the processing circuitry 706 may comprise at least one processor 712 and at least one memory 714. Examples of processor 712 include, but are not limited to, a central processing unit (CPU), a graphical processing unit (GPU), and other forms of processing unit. Examples of memory 714 include, but are not limited to, Random Access Memory (RAM) and Read Only Memory (ROM). When processing circuitry 706 comprises memory 714, memory 714 is generally configured to store instructions or codes executable by processor 712, and possibly operational data. Processor 712 is then configured to execute the stored instructions and possibly create, transform, or otherwise manipulate data to enable the hardware infrastructure 702 of the virtualized processing node 700 to perform its functions.

Additionally, or alternatively, in some embodiments, the processing circuitry 706 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 706 comprises application-specific and/or programmable circuitry (e.g., ASICs, FPGAs), the hardware infrastructure 702 of the virtualized processing node 700 may perform its functions without the need for instructions or codes as the necessary instructions may already be hardwired or preprogrammed into processing circuitry 706. Understandably, processing circuitry 706 may comprise a combination of processor(s) 712, memory(ies) 714, and other application-specific and/or programmable circuitry.

The communication interface(s) 710 enable the virtualized processing node 700 to send messages to and receive messages from other network nodes (e.g., radio network nodes, other core network nodes, servers, etc.). In that sense, the communication interface 710 generally comprises the necessary hardware and software to process messages received from the processing circuitry 706 to be sent by the virtualized processing node 700 into a format appropriate for the underlying transport network and, conversely, to process messages received from other network nodes over the underlying transport network into a format appropriate for the processing circuitry 706. Hence, communication interface 710 may comprise appropriate hardware, such as transport network interface(s) 716 (e.g., port, modem, network interface card, etc.), and software, including protocol conversion and data processing capabilities, to communicate with other network nodes.

The virtualization environment 704 is enabled by instructions or codes stored on memory 708 and/or memory 714. The virtualization environment 704 generally comprises a virtualization layer 718 (also referred to as a hypervisor), at least one virtual machine 720, and at least one VNF 722. The functions of the processing node 700 may be implemented by one or more VNFs 722.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

GLOSSARY

The present description may comprise one or more of the following abbreviation:
- 3GPP Third Generation Partnership Project
- ACK Acknowledgement
- AP Access point
- ARQ Automatic Repeat Request
- BS Base Station
- BSC Base station controller
- BSR Buffer Status Report
- BTS Base transceiver station
- CA Carrier Aggregation
- CC Component carrier
- CCCH SDU Common Control Channel SDU
- CG Configured Grant
- CGI Cell Global Identifier
- CN Core network
- CQI Channel Quality information
- CSI Channel State Information
- CU Central Unit
- DAS Distributed antenna system
- DC Dual connectivity
- DCCH Dedicated Control Channel
- DCI Downlink Control Information
- DL Downlink
- DMRS Demodulation Reference Signal
- DU Distributed Unit
- eMBB Enhanced Mobile Broadband
- eNB E-UTRAN NodeB or evolved NodeB
- ePDCCH enhanced Physical Downlink Control Channel
- E-SMLC evolved Serving Mobile Location Center
- E-UTRA Evolved UTRA
- E-UTRAN Evolved UTRAN
- FDM Frequency Division Multiplexing
- HARQ Hybrid Automatic Repeat Request
- HO Handover
- IAB Integrated Access Backhaul
- IoT Internet of Things
- LCH Logical channel
- LTE Long-Term Evolution
- M2M Machine to Machine
- MAC Medium Access Control
- MBMS Multimedia Broadcast Multicast Services
- MCG Master cell group
- MDT Minimization of Drive Tests
- MeNB Master eNode B
- MME Mobility Management Entity
- MSC Mobile Switching Center
- MSR Multi-standard Radio
- MTC Machine Type Communication
- NACK Negative acknowledgement
- NDI Next Data Indicator
- NR New Radio
- O&M Operation and Maintenance
- OFDM Orthogonal Frequency Division Multiplexing
- OFDMA Orthogonal Frequency Division Multiple Access
- OSS Operations Support System
- PCC Primary Component Carrier
- P-CCPCH Primary Common Control Physical Channel
- PCell Primary Cell
- PCG Primary Cell Group
- PCH Paging Channel
- PCI Physical Cell Identity
- PDCCH Physical Downlink Control Channel
- PDCP Packet Data Convergence Protocol
- PDSCH Physical Downlink Shared Channel
- PDU Protocol Data Unit
- PGW Packet Gateway
- PHICH Physical HARQ indication channel
- PMI Precoder Matrix Indicator
- ProSe Proximity Service
- PSC Primary serving cell
- PSCell Primary SCell
- PUCCH Physical Uplink Control Channel
- PUSCH Physical Uplink Shared Channel
- RAT Radio Access Technology
- RB Resource Block
- RF Radio Frequency
- RLC Radio Link Control
- RLM Radio Link Management
- RNC Radio Network Controller
- RRC Radio Resource Control
- RRH Remote Radio Head
- RRM Radio Resource Management
- RRU Remote Radio Unit
- RSRP Reference Signal Received Power
- RSRQ Reference Signal Received Quality
- RSSI Received Signal Strength Indicator
- RSTD Reference Signal Time Difference
- RTT Round Trip Time
- SCC Secondary Component Carrier
- SCell Secondary Cell
- SCG Secondary Cell Group
- SCH Synchronization Channel
- SDU Service Data Unit
- SeNB Secondary eNodeB
- SGW Serving Gateway
- SI System Information
- SIB System Information Block
- SINR Signal to Interference and Noise Ratio
- SNR Signal Noise Ratio
- SPS Semi-persistent Scheduling
- SON Self-organizing Network
- SR Scheduling Request
- SRS Sounding Reference Signal
- SSC Secondary Serving Cell
- TB Transport Block
- TTI Transmission Time Interval
- Tx Transmitter
- UE User Equipment
- UL Uplink
- URLLC Ultra-Reliable Low Latency Communication
- UTRA Universal Terrestrial Radio Access
- UTRAN Universal Terrestrial Radio Access Network
- V2V Vehicle-to-vehicle
- V2X Vehicle-to-everything
- WLAN Wireless Local Area Network

The invention claimed is:

1. A method performed by a network node, the method comprising:
   determining an integrity risk (IR) parameter associated with a wireless device, the IR parameter indicating a maximum probability of providing a positioning service that is out of a tolerance range;
   transmitting, to the wireless device, positioning assistance information and the IR parameter; and
   receiving, from the wireless device, an estimated position and a protection level (PL) parameter, the PL parameter indicating a statistical error bound computed to guarantee that probability of a position error exceeding the PL is less than or equal to the IR.

2. The method of claim 1, further comprising, determining an integrity of the positioning estimation in accordance with the received PL parameter.

3. The method of claim 1, wherein the IR parameter is associated with one or more positioning reference signal (PRS).

4. The method of claim 1, wherein the positioning assistance information is one of Observed Time Difference of Arrival (OTDOA) information or Downlink Time Difference of Arrival (DL-TDOA) information.

5. The method of claim 4, wherein the IR parameter is associated with a complete set of OTDOA or DL-TDOA information.

6. The method of claim 1, wherein the IR parameter is determined in accordance with at least one of: a clock drift of the network node; a synchronization error of the network node; a wireless device type; a bandwidth and carrier frequency; an indoor or outdoor classification of the wireless device; a serving cell or serving beam; a speed, acceleration, or sensor information from the wireless device; a previous wireless device experience in a similar condition; an expected Reference Signal Time Difference (RSTD) or RSTD search window; and a co-ordinate of a cell boundary or center.

7. The method of claim 1, further comprising:
determining an alert limit (AL) parameter associated with the wireless device, the AL parameter indicating a largest error allowable for safe operation; and
transmitting the AL parameter to the wireless device.

8. The method of claim 7, wherein the AL parameter is determined in accordance with at least one of: a wireless device type; a bandwidth and carrier frequency; an indoor or outdoor classification of the wireless device; map information; and speed, acceleration, or sensor information from the wireless device.

9. A network node comprising a radio interface and processing circuitry configured to:
determine an integrity risk (IR) parameter associated with a wireless device, the IR parameter indicating a maximum probability of providing a positioning service that is out of a tolerance range;
transmit, to the wireless device, positioning assistance information and the IR parameter; and
receive, from the wireless device, an estimated position and a protection level (PL) parameter, the PL parameter indicating a statistical error bound computed to guarantee that probability of a position error exceeding the PL is less than or equal to the IR.

10. The network node of claim 9, further configured to determine an integrity of the positioning estimation in accordance with the received PL parameter.

11. The network node of claim 9, wherein the IR parameter is associated with one or more positioning reference signal (PRS).

12. The network node of claim 9, wherein the positioning assistance information is one of Observed Time Difference of Arrival (OTDOA) information or Downlink Time Difference of Arrival (DL-TDOA) information.

13. The network node of claim 12, wherein the IR parameter is associated with a complete set of OTDOA or DL-TDOA information.

14. The network node of claim 9, wherein the IR parameter is determined in accordance with at least one of: a clock drift of the network node; a synchronization error of the network node; a wireless device type; a bandwidth and carrier frequency; an indoor or outdoor classification of the wireless device; a serving cell or serving beam; a speed, acceleration, or sensor information from the wireless device; a previous wireless device experience in a similar condition; an expected Reference Signal Time Difference (RSTD) or RSTD search window; and a co-ordinate of a cell boundary or center.

15. The network node of claim 9, further configured to:
determine an alert limit (AL) parameter associated with the wireless device, the AL parameter indicating a largest error allowable for safe operation; and
transmit the AL parameter to the wireless device.

16. The network node of claim 15, wherein the AL parameter is determined in accordance with at least one of: a wireless device type; a bandwidth and carrier frequency; an indoor or outdoor classification of the wireless device; map information; and speed, acceleration, or sensor information from the wireless device.

17. A method performed by a wireless device, the method comprising:
receiving, from a network node, positioning assistance information and an integrity risk (IR) parameter, the IR parameter indicating a maximum probability of providing a positioning service that is out of a tolerance range;
performing positioning measurements to determine an estimated position of the wireless device;
determining a Protection Level (PL) parameter based at least in part on the IR parameter, the PL parameter indicating a statistical error bound computed to guarantee that probability of a position error exceeding the PL is less than or equal to the IR; and
transmitting, to the network node, the estimated position and the PL parameter.

18. The method of claim 17, further comprising, monitoring the IR parameter while performing the positioning measurements.

19. The method of claim 17, wherein the IR parameter is associated with one or more positioning reference signal (PRS).

20. The method of claim 17, wherein the positioning assistance information is one of Observed Time Difference of Arrival (OTDOA) information or Downlink Time Difference of Arrival (DL-TDOA) information.

21. The method of claim 20, wherein the IR parameter is associated with a complete set of OTDOA or DL-TDOA information.

22. The method of claim 17, further comprising, monitoring the IR parameter associated with each PRS to determine which PRS to include in positioning measurements.

23. The method of claim 17, further comprising:
receiving an alert limit (AL) parameter, the AL parameter indicating a largest error allowable for safe operation; and
monitoring the AL parameter while performing the positioning measurements.

24. A wireless device comprising a radio interface and processing circuitry configured to:
receive, from a network node, positioning assistance information and an integrity risk (IR) parameter, the IR parameter indicating a maximum probability of providing a positioning service that is out of a tolerance range;
perform positioning measurements to determine an estimated position of the wireless device;
determine a Protection Level (PL) parameter based at least in part on the IR parameter, the PL parameter indicating a statistical error bound computed to guarantee that probability of a position error exceeding the PL is less than or equal to the IR; and transmit, to the network node, the estimated position and the PL parameter.

25. The wireless device of claim 24, further configured to monitor the IR parameter while performing the positioning measurements.

26. The wireless device of claim 24, wherein the IR parameter is associated with one or more positioning reference signal (PRS).

27. The wireless device of claim 24, wherein the positioning assistance information is one of Observed Time Difference of Arrival (OTDOA) information or Downlink Time Difference of Arrival (DL-TDOA) information.

28. The wireless device of claim 27, wherein the IR parameter is associated with a complete set of OTDOA or DL-TDOA information.

29. The wireless device of claim 24, further configured to monitor the IR parameter associated with each PRS to determine which PRS to include in positioning measurements.

30. The wireless device of claim 24, further configured to:
receive an alert limit (AL) parameter, the AL parameter indicating a largest error allowable for safe operation; and monitor the AL parameter while performing the positioning measurements.

* * * * *